United States Patent
Kuznetsov

(10) Patent No.: US 12,261,560 B2
(45) Date of Patent: Mar. 25, 2025

(54) ACTIVE HARMONIC FILTER AND REACTIVE POWER CONTROL SYSTEM FOR NAVAL SHIP POWER SYSTEMS

(71) Applicant: Raytheon Company, Waltham, MA (US)

(72) Inventor: Stephen B. Kuznetsov, Marlborough, MA (US)

(73) Assignee: Raytheon Company, Arlington, VA (US)

( * ) Notice: Subject to any disclaimer, the term of this patent is extended or adjusted under 35 U.S.C. 154(b) by 147 days.

(21) Appl. No.: 18/311,661

(22) Filed: May 3, 2023

(65) Prior Publication Data

US 2024/0372499 A1 Nov. 7, 2024

(51) Int. Cl.
| | |
|---|---|
| *H02P 6/10* | (2006.01) |
| *B60L 15/20* | (2006.01) |
| *B60L 50/30* | (2019.01) |
| *B60L 53/20* | (2019.01) |
| *H02M 5/44* | (2006.01) |
| *H02P 23/00* | (2016.01) |
| *H02P 27/06* | (2006.01) |
| *H02P 29/50* | (2016.01) |

(52) U.S. Cl.
CPC ............ *H02P 29/50* (2016.02); *B60L 15/20* (2013.01); *B60L 50/30* (2019.02); *B60L 53/20* (2019.02); *H02M 5/44* (2013.01); *H02P 23/00* (2013.01); *H02P 27/06* (2013.01); *B60L 2200/32* (2013.01); *B60L 2210/20* (2013.01)

(58) Field of Classification Search
CPC .......... H02P 29/50; H02P 23/00; H02P 27/06; H02P 9/007; H02M 5/44; H02J 3/30
See application file for complete search history.

(56) References Cited

U.S. PATENT DOCUMENTS

| | | | |
|---|---|---|---|
| 9,973,103 B1 | 5/2018 | Vadhavkar et al. | |
| 10,491,074 B2 | 11/2019 | Kuznetsov | |
| 11,418,031 B2 | 8/2022 | Kuznetsov | |
| 11,418,035 B2 | 8/2022 | Kuznetsov | |
| 11,469,618 B2 | 10/2022 | Zhao et al. | |
| 2011/0050151 A1* | 3/2011 | El-Antably | H02P 29/50 318/717 |
| 2016/0149504 A1 | 5/2016 | Quigley | |

(Continued)

FOREIGN PATENT DOCUMENTS

CN 101636899 A 1/2010

OTHER PUBLICATIONS

International Search Report and Written Opinion of the International Searching Authority dated Oct. 29, 2024 in connection with International Patent Application No. PCT/US2024/018712, 19 pages.

(Continued)

*Primary Examiner* — Muhammad S Islam

(57) ABSTRACT

A system includes a main power source configured to provide power to at least one pulsed electrical load. The system also includes a propulsion converter configured to drive a propulsion motor. The system further includes a controllable-field induction electrical machine coupled to the at least one pulsed load. The controllable-field induction electrical machine is configured to suppress one or more propulsion current harmonics generated by the propulsion converter that affect the at least one pulsed load.

20 Claims, 14 Drawing Sheets

(56) References Cited

U.S. PATENT DOCUMENTS

2016/0226425 A1 8/2016 Kawashima
2016/0336928 A1 11/2016 Kuznetsov
2019/0245458 A1 8/2019 Wang et al.
2022/0255329 A1 8/2022 Yanagizawa et al.

OTHER PUBLICATIONS

Mahela et al., "Comprehensive Overview of Low Voltage Ride Through Methods of Grid Integrated Wind Generator", IEEE Access, vol. 7, Jul. 2019, 28 pages.
Raju et al., "Enhanced Decoupled Power control of Wind Turbine driven DFIG using DVR under Unbalanced Grid Voltage", 2012 International Conference on Advances in Power Conversion and Energy Technologies (APCET), Aug. 2012, 5 pages.

* cited by examiner

ACTIVE HARMONIC FILTER AND REACTIVE POWER CONTROL SYSTEM FOR NAVAL SHIP POWER SYSTEMS

TECHNICAL FIELD

This disclosure is directed in general to electrical power systems. More specifically, this disclosure relates to an active harmonic filter and reactive power control system for naval ship power systems.

BACKGROUND

The issue of power control on naval ships is often associated with one or more problems, particularly as it relates to static filters. Conventional naval ship power filters utilize static alternating current (AC) capacitor banks of fixed capacity, which tend to be load specific. If a load is variable, such as in radar applications, the filtering current output capacity may be either too low or too high to be optimum. Existing electrostatic capacitor banks have relatively low energy density at a typical 480 volt utilization voltage. Likewise, switched capacitor banks generate extra harmonics on the incoming ship bus and tend to have low reliability. As a consequence, the extra harmonics can cause equipment shut down (such as radar shut down).

SUMMARY

This disclosure relates to an active harmonic filter and reactive power control system for naval ship power systems.

In a first embodiment, a system includes a main power source configured to provide power to at least one pulsed load. The system also includes a propulsion converter configured to drive a propulsion motor. The system further includes a controllable-field induction electrical machine coupled to the at least one pulsed load. The controllable-field induction electrical machine is configured to suppress one or more propulsion current harmonics generated by the propulsion converter that affect the at least one pulsed load.

In a second embodiment, a system includes an alternating current (AC) generator configured to provide real and reactive power for at least one pulsed load over a main bus. The system also includes at least one hybrid energy storage module (HESM) configured to store at least some of the real and reactive power as energy for later use by the at least one pulsed load. The system further includes a high-speed asynchronous rotating machine (HSRM) configured to (i) supply the reactive power to the at least one HESM via a stator port and (ii) suppress one or more harmonics generated by a first AC-to-AC frequency converter that affect the at least one pulsed load.

In a third embodiment, a filter device includes an inertial energy storage flywheel. The filter device also includes a controllable-field induction electrical machine coupled to the inertial energy storage flywheel. The controllable-field induction electrical machine includes a stator input winding and multiple stator output windings configured to connect to at least one pulsed load. The controllable-field induction electrical machine also includes a polyphase rotor circuit configured to receive a feed-forward signal that is generated in response to one or more propulsion current harmonics that affect the at least one pulsed load. The feed-forward signal is configured to control the controllable-field induction electrical machine and the inertial energy storage flywheel to suppress the one or more propulsion current harmonics.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
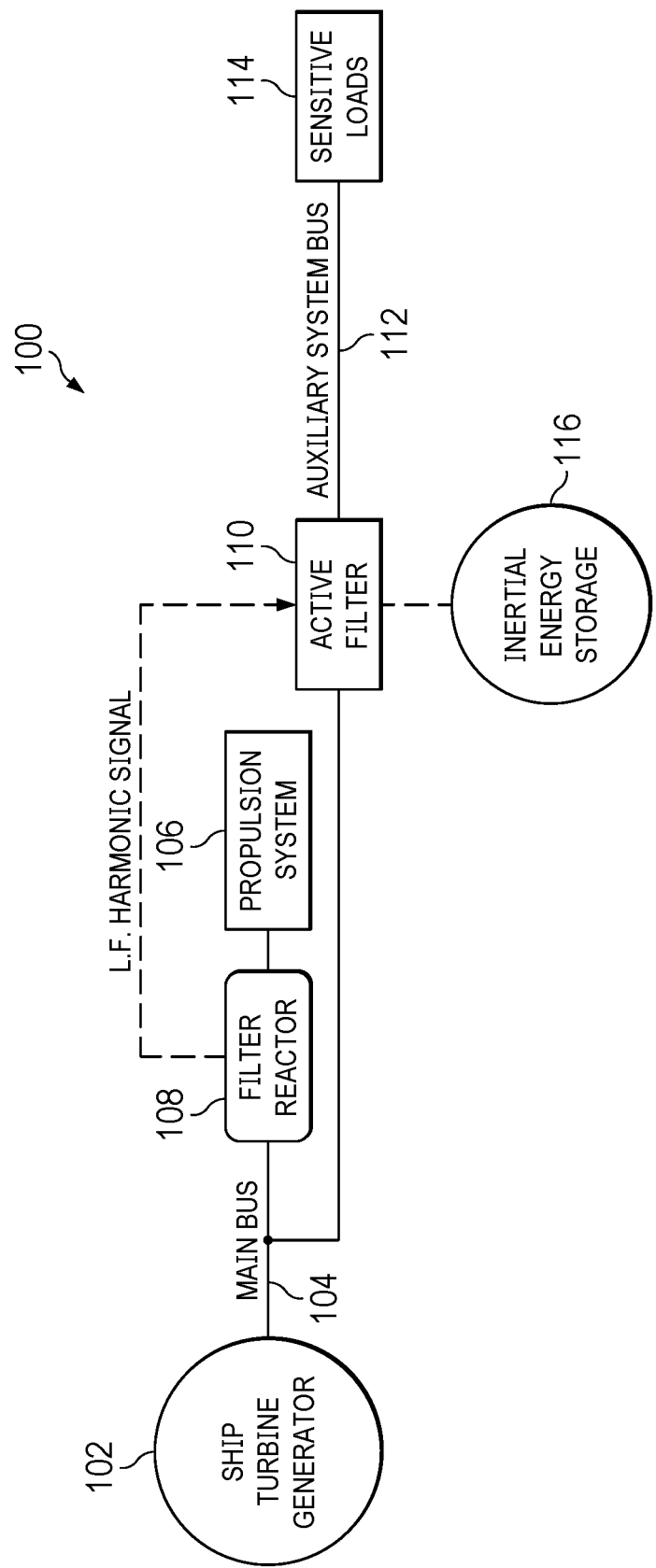
FIG. 1 illustrates an example an active harmonic filter and reactive power control system according to this disclosure.

FIGS. 1 through 7, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure. It will be understood that embodiments of this disclosure may include any one, more than one, or all of the features described here. Also, embodiments of this disclosure may additionally or alternatively include other features not listed here.

As discussed above, the issue of power control on naval ships is often associated with one or more problems, particularly as it relates to static filters. Conventional naval ship power filters utilize static alternating current (AC) capacitor banks of fixed capacity, which tend to be load specific. If a load is variable, such as in radar applications, the filtering current output capacity may be either too low or too high to be optimum. Existing electrostatic capacitor banks have relatively low energy density at a typical 480 volt utilization voltage. Likewise, switched capacitor banks generate extra harmonics on the incoming ship bus and tend to have low reliability. As a consequence, the extra harmonics can cause equipment shut down (such as radar shut down).

Low-frequency harmonics and stochastic electrical transients can be generated by a main propulsion electronic power converter driving either an AC or direct current (DC) propulsion motor. In the case of a large ship propulsion AC motor, the output frequency is typically a variable and low frequency (such as about 5-40 Hz), and the system operates from a medium frequency (such as about 60 Hz) AC bus. Electrical recurring harmonics from the propulsion converter based upon fundamental frequencies of about 2-30 Hz are difficult to attenuate with capacitor banks due to the large size of capacitor banks and concerns over undesirable resonant phenomena. Consequently, many ship power systems only utilize a series polyphase inductive reactor as the interface filter from the propulsion converter to the main AC input bus. This scheme has limited capability in filtering a spectrum of propulsion harmonics from adversely affecting other ship sub-systems requiring undistorted input waveforms.

This disclosure provides embodiments of an active harmonic filter and reactive power control system for naval ship power systems. Among other things, the disclosed embodiments address the problem of ship-induced propulsion harmonics, which adversely affect radar discrimination ability or other operations. The disclosed embodiments use compact rotating machinery with inertial energy storage with all-electric ship propulsion drive in order to attenuate propulsion system harmonics. The disclosed embodiments enable ship AC power systems to be smaller and have higher power densities. In addition, the disclosed embodiments provide an uninterruptible power supply (UPS) feature for radar power when the main ship bus is down.

It will be understood that embodiments of this disclosure may include any one, more than one, or all of the features described here. Also, embodiments of this disclosure may additionally or alternatively include other features not listed here. While the disclosed embodiments may be described with respect to naval ships and early warning radar power systems, these embodiments are also applicable in any other suitable systems or applications.

FIG. 1 illustrates an example an active harmonic filter and reactive power control system 100 according to this disclosure. In some embodiments, the system 100 can include or be part of a naval ship power system. However, the system 100 can include or be a part of any other suitable system(s).

In a system such as the one shown in FIG. 1, specialized loads like radar may require a power supply AC bus separate from a main ship electrical bus for multiple reasons. One reason may be to isolate the radar load or other load from disturbances and electrical perturbations that can occur on the main ship electrical bus. Another reason may be to isolate the main ship electrical bus from possible pulsing and intermittent duty cycles of the specialized loads, which could otherwise adversely affect the main ship electrical system.

As shown in FIG. 1, the system 100 includes a ship turbine generator 102 that provides power to the system 100 over a main electrical bus 104. The system 100 also includes a ship propulsion system 106 that can include a propulsion converter driving an AC or DC propulsion motor. The ship propulsion system 106 can generate low-frequency harmonics and stochastic electrical transients. Connected to the ship propulsion system 106 is a series-connected filter reactor 108 that can include a set of polyphase sense windings co-wound with main power windings. The filter reactor 108 produces a feed-forward low-frequency harmonic signal in response to one or more propulsion current harmonics generated by the propulsion system 106. The harmonic signal is provided to an active filter 110, which is series-connected to an auxiliary system bus 112 (as opposed to a shunt connection that is common on conventional systems) and which provides power to one or more sensitive loads 114. The one or more sensitive loads 114 can be one or more pulsed loads, such as radar, lasers, or the like. The active filter 110 receives the harmonic signal from the filter reactor 108, processes the signal, and actively adjusts filtering parameters to minimize the effects on the load(s) 114 from the low-frequency harmonics generated by the ship propulsion system 106.

The system 100 also includes an inertial energy storage 116 coupled to the active filter 110. In some embodiments, the inertial energy storage 116 includes a flywheel. During operation of the system 100, kinetic energy of the inertial energy storage 116 can be converted to pulsed power, which can be supplied to one or more loads 114. This allows only substantially steady-state energy to be received from the main bus 104.

The active filter 110 and the connected inertial energy storage 116 provide an adjustable reactive power source with energy storage, which can regulate system power on the main electrical bus 104 and absorb or dissipate the one or more propulsion harmonics. In addition, the active filter 110 and the inertial energy storage 116 can provide energy storage for an uninterruptible power supply (UPS) function when the main electrical bus 104 is temporarily unavailable, such as to allow minutes of continuous or critical power use by the load(s) 114.

As described above, the system 100 electrically isolates the sensitive load(s) 114 from main ship propulsion harmonics, which are principally low-frequency harmonics. The system 100 provides more effective filter and harmonic/reactive power control than conventional systems in which the filter in not connected in series. Additional details and benefits will be described in conjunction with other embodiments described below.

Figure 2:
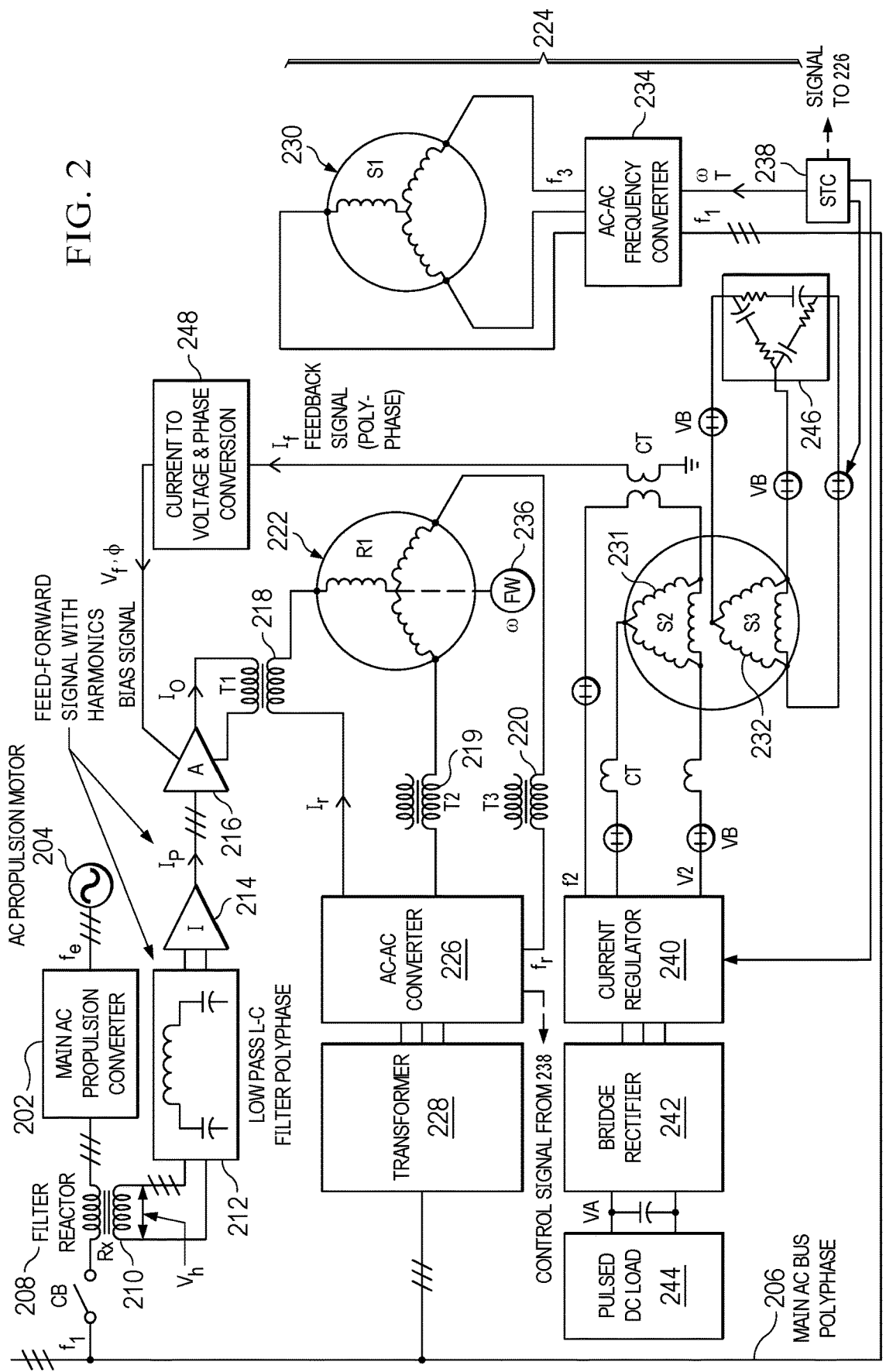
FIG. 2 illustrates another active harmonic filter and reactive power control system according to this disclosure.

FIG. 2 illustrates another active harmonic filter and reactive power control system 200 according to this disclosure. In some embodiments, the system 200 can include or be part of a naval ship power system. However, the system 200 can include or be a part of any other suitable system(s). As described below, the system 200 includes a four-port doubly-fed induction electrical machine with inertial storage flywheel and harmonic suppression of propulsion motor converter harmonic currents with a feed-forward control loop and actively-modulated machine rotor excitation circuit. The system 200 includes multiple components that may be the same as or similar to corresponding components in the system 100 of FIG. 1.

As shown in FIG. 2, the system 200 includes a main propulsion converter 202 driving an AC or DC propulsion motor 204. The main propulsion converter 202 can generate low-frequency harmonics and stochastic electrical transients. In the case of a large ship propulsion AC motor 204, the output frequency Fp can be variable and low frequency (such as about 5-40 Hz), and the system 200 may operate from a medium frequency (such as about 60 Hz) AC bus 206. One or more electrical recurring harmonics from the main propulsion converter 202 based upon fundamental frequencies of about 2-30 Hz are difficult to attenuate with capacitor banks due to the large size of capacitor banks and concerns over undesirable resonant phenomena.

The system 200 also includes an input propulsion series-connected filter reactor 208 that includes a set of polyphase sense windings 210 co-wound with main power windings. The polyphase sense windings 210 produce a low-level signal Vh in response to one or more propulsion current harmonics. The signal Vh is brought into a low-pass polyphase filter 212 to eliminate high-frequency switching transients from the main propulsion converter 202. Each of the individual phase signals is directed into a phase-inverter operational amplifier 214, such as a broadband 180° inverter, producing an output signal Ip that includes a group of polyphase feed-forward signals. The output signal Ip includes a harmonic spectrum of low frequencies "fh" and not just one individual frequency. For example, if the main AC propulsion frequency is 5 Hz, the set of normal six-pulse harmonics at the 5th, 7th, 11th, and 13th harmonics can produce principal undesirable harmonic frequencies of 25 Hz, 30 Hz, 55 Hz, and 65 Hz. If the main propulsion converter 202 is a twelve-pulse converter, the 11th, 13th, 23rd, and 25th harmonics are of greater interest. This group of polyphase feed-forward signals forming the output signal Ip is fed into a set of variable-gain polyphase power amplifiers 216, which may have a forward gain (such as 100:1) for amplification of the feed-forward signals.

The output signals from the set of power amplifiers 216 (identified as "Io") are fed into a set of polyphase harmonic cancellation injection transformers 218-220 ("T1", "T2", "T3") on the high-impedance or primary side. The transformers 218-220 are coupled to a polyphase rotor circuit 222 of a doubly-fed wound-rotor induction electrical machine 224, which is described in greater detail below. The secondary or low impedance sides of the transformers 218-220 are serially connected to a rotor excitation circuit (current "Ir") that includes a controlled current-source variable-frequency AC-to-AC converter 226 and an input step-down transformer 228 from the main AC bus 206.

Figure 3A:
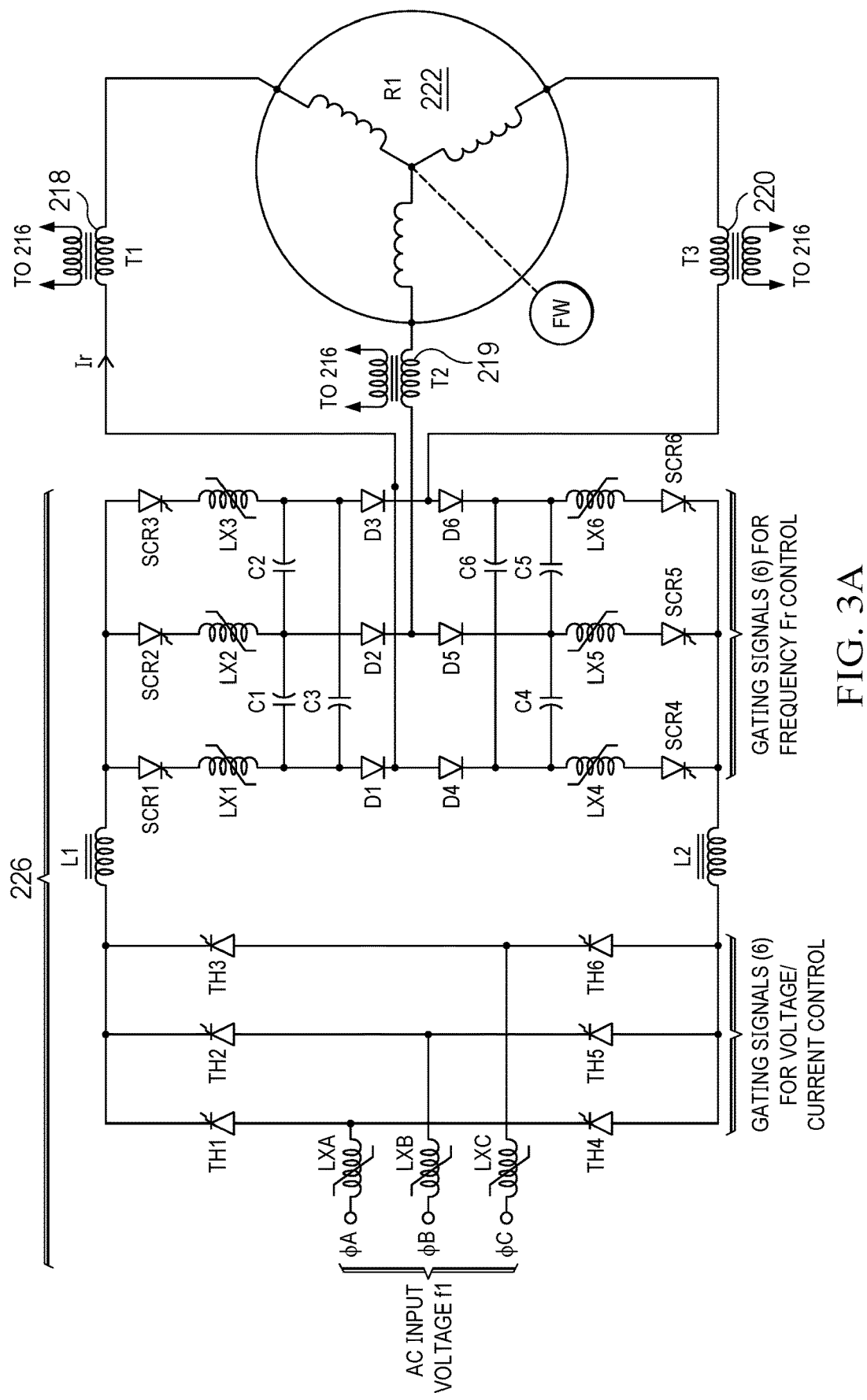
FIG. 3A illustrates further details of an example alternating current (AC)-to-alternating current (AC) converter coupled to a rotor circuit according to this disclosure.

FIG. 3A illustrates further details of an example AC-to-AC converter 226 coupled to the rotor circuit 222 according to this disclosure. As shown in FIG. 3A, the AC-to-AC converter 226 uses internal power semiconductor switching circuitry for a current-source AC-to-DC-to-AC rectifier/inverter, along with the injection transformers 218-220 at the rotor excitation circuit feed. In FIG. 3A, the AC-to-AC converter 226 includes twelve thyristor devices. However, this is merely one example, and other embodiments could include IGBT switching devices, IGCT switching devices, high-power MOSFET switching devices, or any other suitable switching devices.

The AC-to-AC converter 226 and the injection transformers 218-220 with the feed-forward signals combine to excite the polyphase rotor circuit 222 of the induction electrical machine 224. The output frequency of the AC-to-AC converter 226, denoted "fr," is a low "slip" frequency (such as about 2-6 Hz) and beyond the lower end of the spectrum for a range of electrical frequencies "fh" in the feed-forward signal path. In short, the frequency fr can be about 1/10th or smaller of the frequency of the lowest of the propulsion harmonics of interest at any given instant of time. Consequently, the polyphase rotor circuit 222 receives a base excitation frequency fr modulated by a harmonic cancellation frequency fh at a substantial power level commensurate in amplitude with the main excitation level from the AC-to-AC converter 226.

Figure 3B:
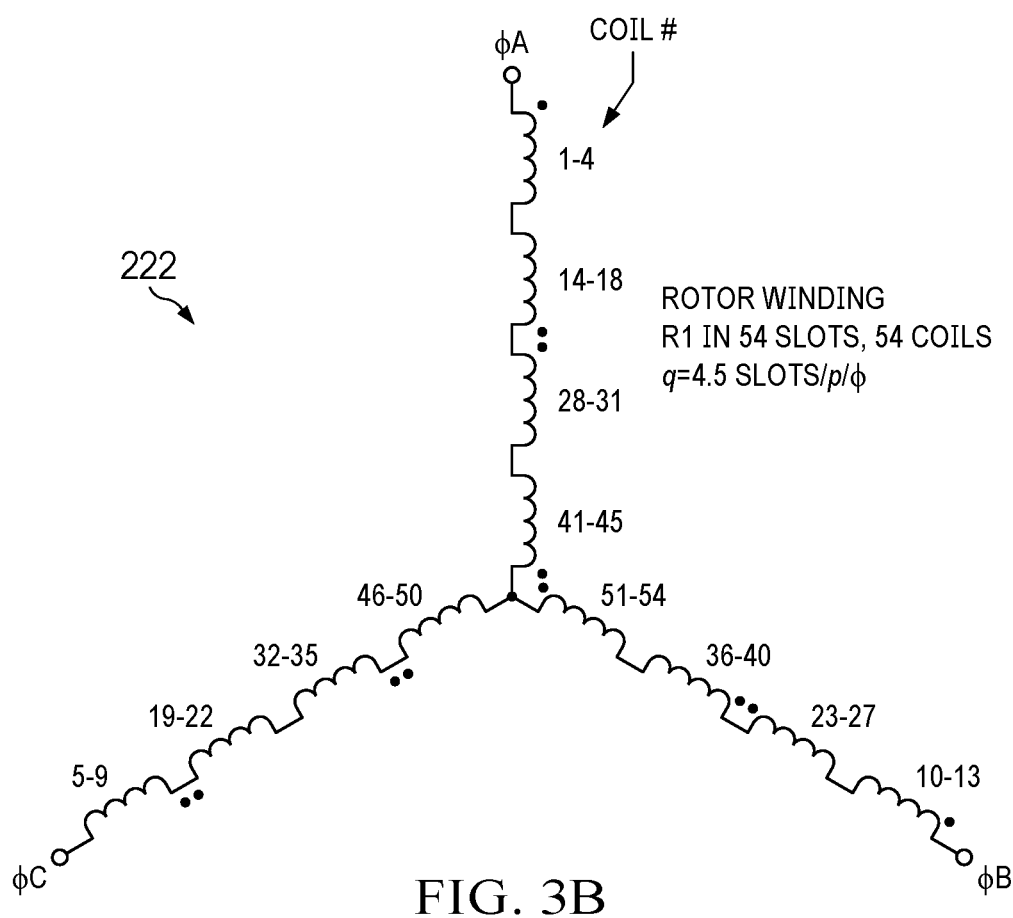
FIG. 3B illustrates an example winding diagram for a polyphase rotor circuit according to this disclosure.

FIG. 3B illustrates an example winding diagram for the polyphase rotor circuit 222 according to this disclosure. As shown in FIG. 3B, the polyphase rotor circuit 222 is configured as a wye-connected circuit. The induction electrical machine 224 serves as a rotating current amplifier from rotor to stator windings with a high coupling coefficient, such as a coupling coefficient over 95%.

Figure 3C:
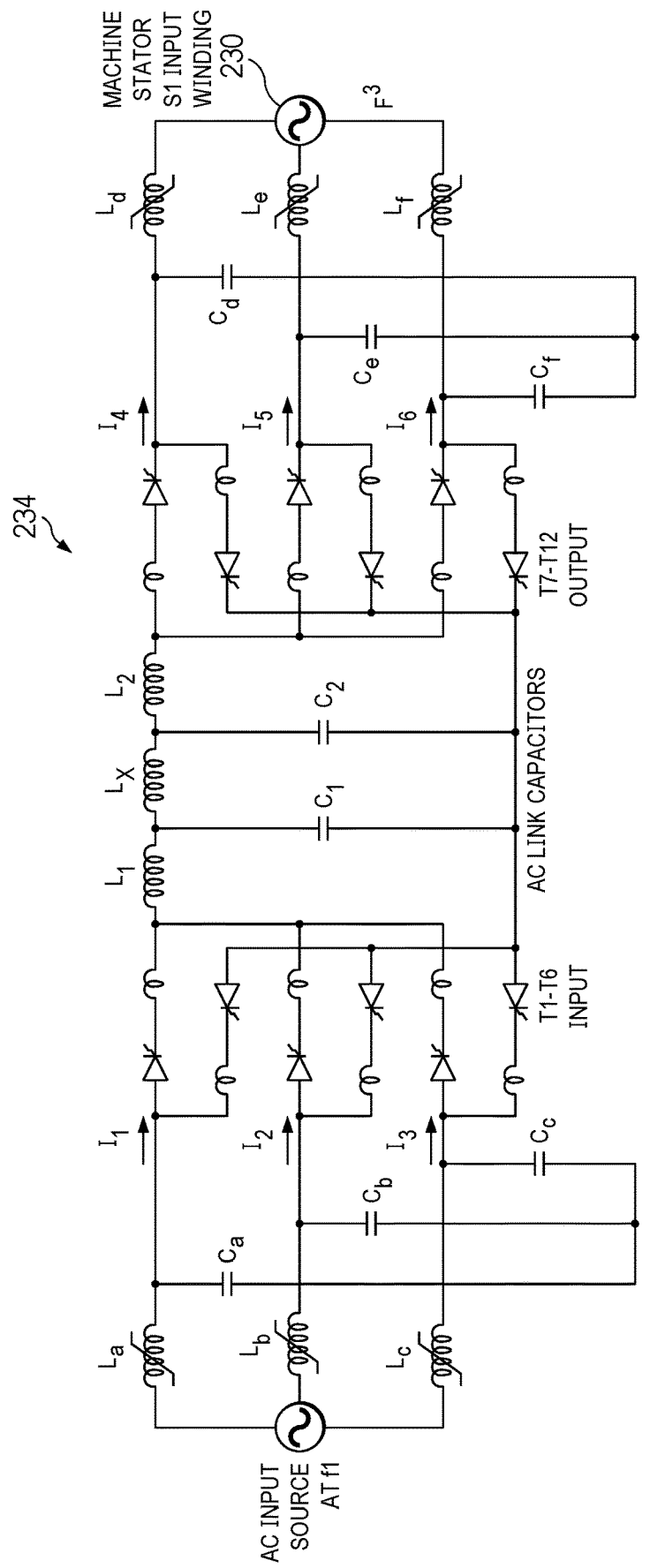
FIG. 3C illustrates further details of an example frequency and voltage converter coupled to a stator input winding according to this disclosure.

The induction electrical machine 224 has three stator windings, including a stator input winding 230 ("S1") and dual stator output windings 231 and 232 ("S2" and "S3"). Each winding has a separate function. The stator input winding 230 is a polyphase wye-connected motoring winding fed by an AC-to-AC frequency and voltage converter 234 that uses internal power semiconductor switching circuitry. FIG. 3C illustrates further details of an example frequency and voltage converter 234 coupled to the stator input winding 230 according to this disclosure. As shown in FIG. 3C, the frequency and voltage converter 234 includes AC link type internal circuitry for AC-to-AC frequency conversion from frequency f1 to frequency f3, which is input to the stator input winding 230. In FIG. 3C, the frequency and voltage converter 234 includes twelve thyristor devices. However, this is merely one example, and other embodiments could include IGBT switching devices, IGCT switching devices, high-power MOSFET switching devices, or any other suitable switching devices.

Figure 3D:
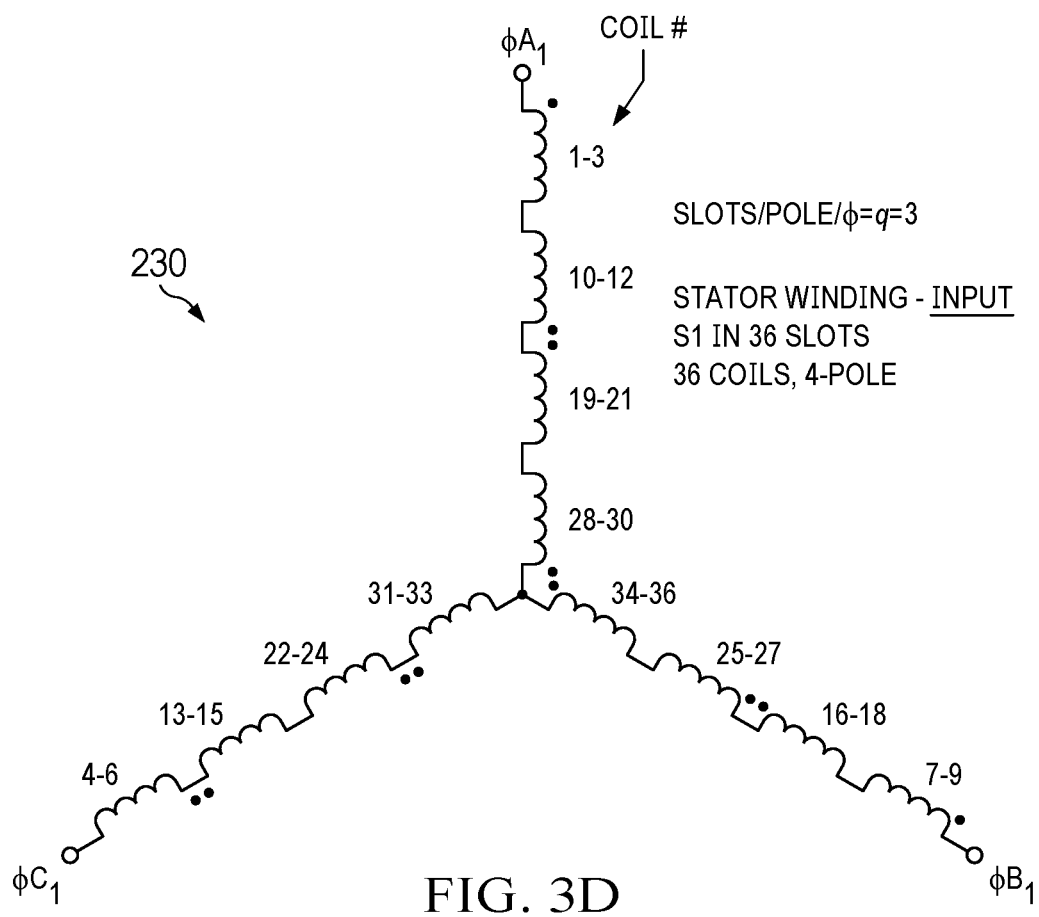
FIGS. 3D through 3F illustrate example winding diagrams for different stator windings according to this disclosure.

The induction electrical machine 224 also includes an inertial energy storage flywheel 236 coupled to the rotor circuit 222. The inertial energy storage flywheel 236 operates to store energy that can be provided to the load(s) on the system 200. A speed and torque controller (STC) 238 coupled to the frequency and voltage converter 234 establishes the frequency f3 and magnetic flux level fed to the induction electrical machine 224 to maintain the inertial energy storage flywheel 236 at a maximum speed and kinetic energy level after load discharge events. The STC 238 also sends a control signal to the AC-to-AC converter 226 since the base excitation frequency fr is coordinated with the frequency f3 at the stator input winding 230 to determine the variable machine shaft speed and flywheel kinetic energy level. In some embodiments, the output frequency f3 is a medium to high frequency (such as about 100-400 Hz) to allow high electrical machine shaft speeds for the inertial storage capability. To maximize overall efficiency, the rotor base frequency fr can be kept in a range of about 1%-1.5% of the frequency f3, or about 1-6 Hz. FIG. 3D illustrates an example winding diagram for the stator input winding 230. As shown in FIG. 3D, the stator input winding 230 is configured as a wye-connected circuit.

Figure 3E:
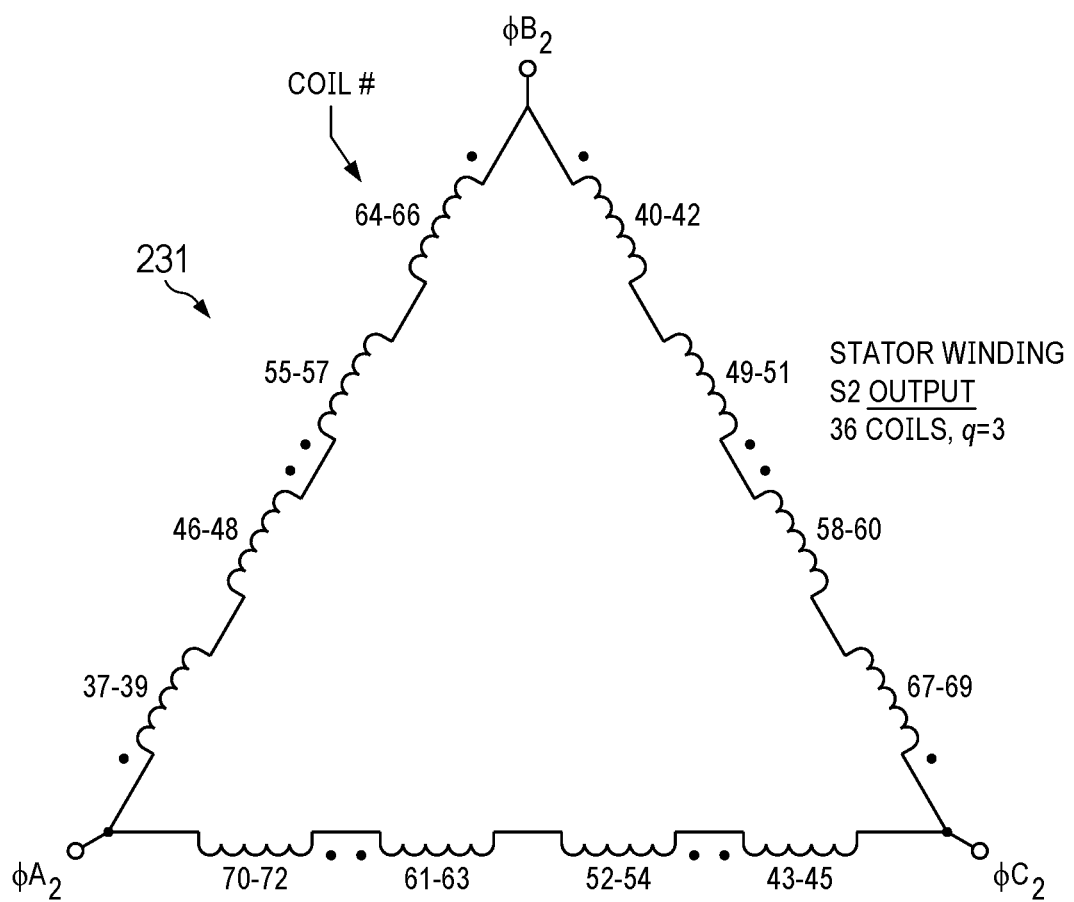

The stator output windings 231 and 232 of the induction electrical machine 224 are both polyphase and isolated from each other. The stator output winding 231 includes the main output port, which feeds a sensing current transformer CT and a vacuum breaker VB and directs main output power at voltage V2 and frequency f2 to a polyphase current regulator 240 and to an AC-DC full wave bridge rectifier 242. The polyphase current regulator 240 is controlled by one output function of the STC 238. The power output of the bridge rectifier 242 is capacitive filtered at a potential Vd. The power output is directed to a pulsed or steady-state DC load 244. FIG. 3E illustrates an example winding diagram for the stator output winding 231. As shown in FIG. 3E, the stator output winding 231 is delta-connected.

Figure 3F:
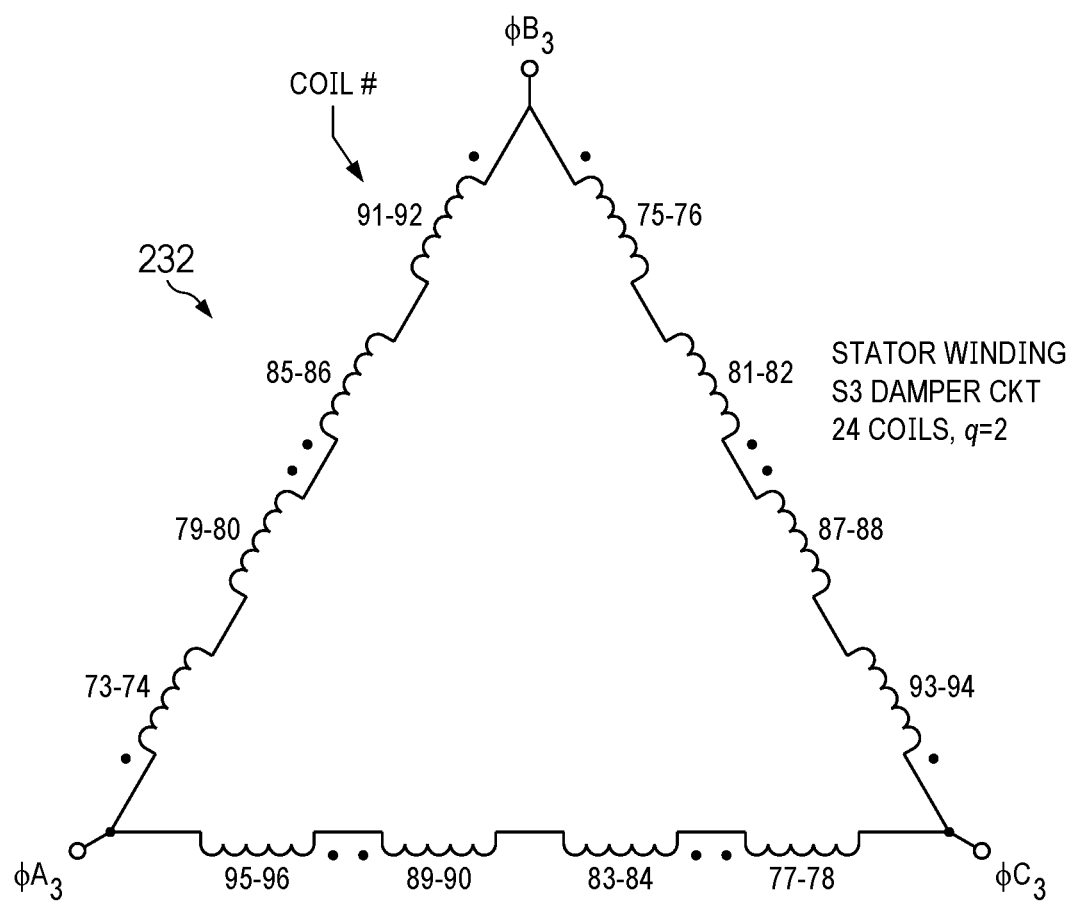

The stator output winding 232 includes an auxiliary output port, which connects to a polyphase damper circuit 246. As shown in FIG. 2, the polyphase damper circuit 246 can be a delta-connected resistive-capacitive network, which serves to dampen oscillations in shaft speed or allow dynamic braking of the inertial energy storage flywheel 236 when the AC main bus 206 cannot accept machine-generated regenerative energy to slow the inertial energy storage flywheel 236 or absorb possible electro-mechanical oscillations. Vacuum circuit breakers VB are shown in each phase, which connect the polyphase damper circuit 246 to the stator output winding 232 by action of the STC 238 if shaft oscillations or overspeed conditions are detected. FIG. 3F illustrates an example winding diagram for the stator output winding 232. As shown in FIG. 3F, the stator output winding 232 is delta connected.

The system 200 also includes a set of current transformers CT on the stator output winding 231, which provide a feedback signal "If" to a low-level current-to-voltage converter 248 or operational amplifier with output voltage Vf. A set of bias signals output from the current-to-voltage converter 248 are directed to the power amplifier 216 on a phase-by-phase basis. Each bias signal at voltage Vf provides a phase angle input to the power amplifier 216 to optimize the phase angle of the injected signal Io in order to permit maximum cancellation of the propulsion harmonics at the frequency fh.

Table 1 gives representative design values for a 4,000 kVA-rated machine with a 15,000 RPM maximum speed and a 75 MJ energy storage. Of course, these design values are merely examples, and other values are possible and within the scope of this disclosure.

TABLE 1

Representative Design Values

| Representative Electrical Design Parameter | Wound-Rotor 4-Pole Multi-port Induction Machine |
|---|---|
| Power Output/Stored Energy Rating | 3.75 MW, 75 MJ |
| Excitation Winding R1 | 600 VAC, 3-phase, 60 kVA, 2-150 Hz |
| Primary Winding Input to S1 | 4200 VAC, 3-phase, 260-520 Hz, 4000 kVA |
| Output or Secondary Winding from S2 | 750 VAC, 3-phase, 500 Hz, 3800 kVA |
| DC Output after full rectification | 1000 VDC, 3750 Amps, 3.75 MW |
| Damper or Harmonic Control Winding S3 | 250 VAC, 250 kVA, 3-phase, 578 Amps, 500 Hz |
| Machine Operating Speed Range | 7,500-15,000 rpm |
| Total No. of stator coils | 96 in 3 wye & delta groups, overlay in 36 slots |
| No. of rotor coils | 54 in series wye connection 4.5 slots/pole/phase |
| Excitation Injection Transformer Rating | 15 kVA, 58 Amps secondary, 16 Amps primary |
| Airgap Peak Induction | 1.85 T |

Figure 4:
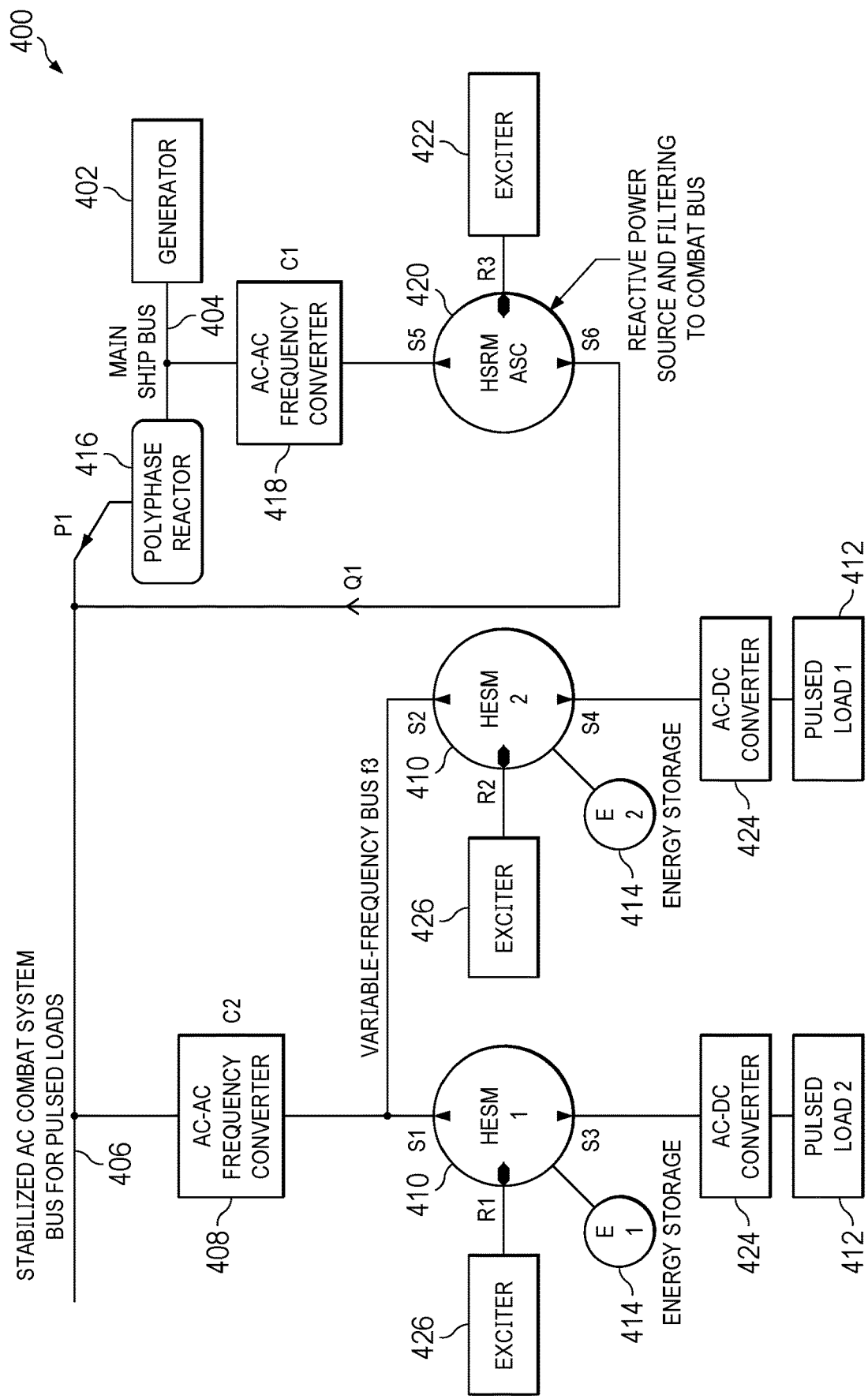
FIG. 4 illustrates yet another active harmonic filter and reactive power control system according to this disclosure.

FIG. 4 illustrates yet another active harmonic filter and reactive power control system 400 according to this disclosure. In some embodiments, the system 400 can include or be part of a naval ship power system. However, the system 400 can include or be a part of any other suitable system(s). The system 400 includes multiple components that may be the same as or similar to corresponding components in the system 100 of FIG. 1 or the system 200 of FIG. 2. As shown in FIG. 4, the system 400 includes a main electrical (ship) generator 402 that provides power over a main electrical bus 404. The apparent power from the main electrical bus 404 includes real power (P1) and reactive power (Q1), at least some of which is provided to a dedicated combat systems bus 406 or a system of auxiliary system busses. The real and reactive power is provided to an AC-to-AC frequency converter 408 and to multiple hybrid energy storage modules (HESMs) 410.

The AC-to-AC frequency converter 408 converts the combat system bus frequency f1 to a higher frequency f3 of polyphase power to feed the HESMs 410 over a variable frequency AC bus. The HESMs 410 operate as power and stored energy feeds for multiple corresponding pulsed loads 412 (such as high power lasers, radar, and the like), which are typically DC loads and may have a stochastic or pulsed duty cycle. Each HESM 410 includes an inertial energy storage motor-generator set that has electrical outputs specifically configured for the specialized loads 412. Each HESM 410 is also coupled to an inertial energy storage flywheel 414, each with an inertial energy storage capability E1 and E2 that is tailored to a specific duty cycle of the respective load 412. While FIG. 4 shows two HESMs 410 for two loads 412, this is merely for illustration. Other embodiments could include one or more than two HESMs 410 and loads 412. The system 400 provides superior electromagnetic conducted emissions over conventional systems and offers total galvanic isolation of pulsed effectors (such as lasers) from pulsed sensors (such as radar).

The real power P1 for the feed to the combat systems bus 406 is provided from the main electrical bus 404 through a polyphase AC series reactor 416, which filters out higher-frequency harmonics created on the main electrical bus 404. The reactor 416 allows low-frequency power (mainly real power) to pass through without attenuation. The reactive power Q1 for the feed to the combat systems bus 406 is provided through the use of two main elements: (i) an AC-to-AC frequency converter 418 (which can be polyphase input and polyphase output) and (ii) a high-speed asynchronous rotating machine (HSRM) 420. The HSRM 420 includes an input port/stator winding S5 from the AC-to-AC frequency converter 418 and an isolated output port/stator winding S6. In some embodiments, the HSRM 420 can be a wound-rotor doubly-fed induction generator (DFIG). The HSRM 420 also includes an excitation port R3, which receives an excitation signal from an exciter 422. In some embodiments, the excitation port R3 can be a polyphase AC input for creating the HSRM's magnetic revolving field and can serve to control an exact amount of reactive power output and its voltage level.

The HSRM 420 operates as an asynchronous condenser (ASC) providing adjustable reactive power Q1 at a stator port S6 from the main electrical bus 404 without the need for inertial energy storage. The reactive power Q1 is in-phase quadrature with the real power P1 at the combat systems bus 406. By having the AC-to-AC frequency converter 418 adjust the speed of the HSRM 420 and consequently the magnetic flux level of the HSRM 420, the combat systems bus 406 may need some level of reactive power to commutate switching devices inside the converter 408, as well as provide for any inductive drops (using reactive power) in power transmission cables along the combat systems bus

406. Moreover, the HSRM 420 acts as an active filter at the port S6 for any higher harmonics that are generated by the AC-to-AC frequency converter 418, such as 5th, 7th, 11th, and 13th harmonics of the line frequency used on the combat systems bus 406. This arrangement minimizes the need for having large static capacitor banks on the combat systems bus 406, as typically high-voltage static capacitor banks use flammable insulating liquids that are not desirable on naval ships.

In some embodiments, the HESMs 410 have an equal number of stator poles and have a same upper limit for the speed of the corresponding flywheel 414. Fine speed control for each HESM 410 can be regulated by the final slip frequency output of each machine exciter R1 and R2, since differences in loadings or duty cycles can cause the shaft speeds to deviate from one another. In other embodiments, each HESM 410 may be fitted with an independent frequency converter 408 for operating widely-different loads.

The HESMs 410 have stator ports S1 and S2 and have respective AC output ports S3 and S4. Each output port S3 and S4 is coupled to a distinct frequency output AC-to-DC converter 424, which rectifies the AC power and sends this power as DC to the respective loads 412. The HESMs 410 are excited by separate AC variable-frequency exciters 426, which power each HESM 410 through rotor port R1 and R2 and may be connected to a slip-ring conductor assembly and electrical brushes to transfer power into each rotor. The exciters 426 can be fast-response AC power supplies, such as those with a 20 KHz bandwidth, which can respond to stochastic or transient power loading.

As kinetic energy is extracted from the inertial energy storage flywheel 414 to respond to surges in load demands and the speed of the HESM 410 falls, each exciter 426 monitors the machine shaft speed and consequently boosts the excitation rotor frequency in inverse proportion to the shaft speed in order to maintain the output frequency at the S3 and S4 ports at constant values. This can help to support efficient AC-to-DC rectification. The S3 and S4 ports will have no transients or harmonics from the main ship electrical 404, and thus consequent rectification to DC power is stable and of superior quality.

In some embodiments, the loads may have widely-divergent pulsed duty cycles or stochastic loads. In such cases, the surge energy is drawn from the inertial energy storage flywheel 414, and the effective load on the AC-to-AC frequency converter 408 (and thus the combat system bus 406) is buffered and of nearly steady-state power draw. Thus, the power P1 is buffered without having load transients. Further filtering is provided by the polyphase AC series reactor 416.

The combination of the AC-to-AC frequency converters 408 and 418 and the inertial storage provided by the flywheels 414 helps to ensure that the main electrical bus 404 does not experience any pulsing or thumping of effector or sensor loads. Also, the HSRM 420 operating as an ASC machine provides controllable negative or positive VARs to filter the main AC propulsion harmonics at any speed. Here, harmonic energy can be absorbed in the rotor and stator windings of the HSRM 420.

Figure 5:
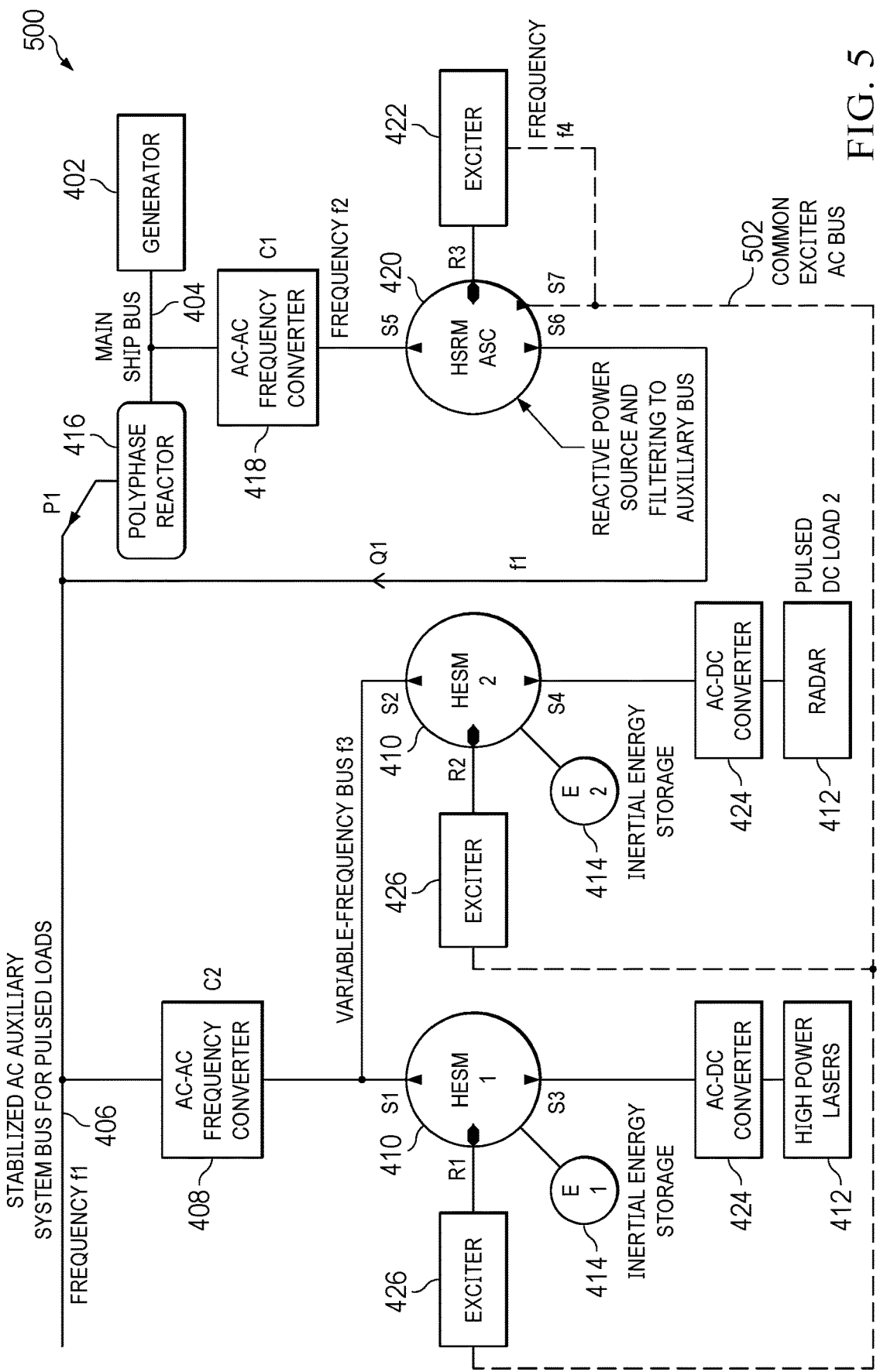
FIG. 5 illustrates still another active harmonic filter and reactive power control system according to this disclosure.
Figure 6A:
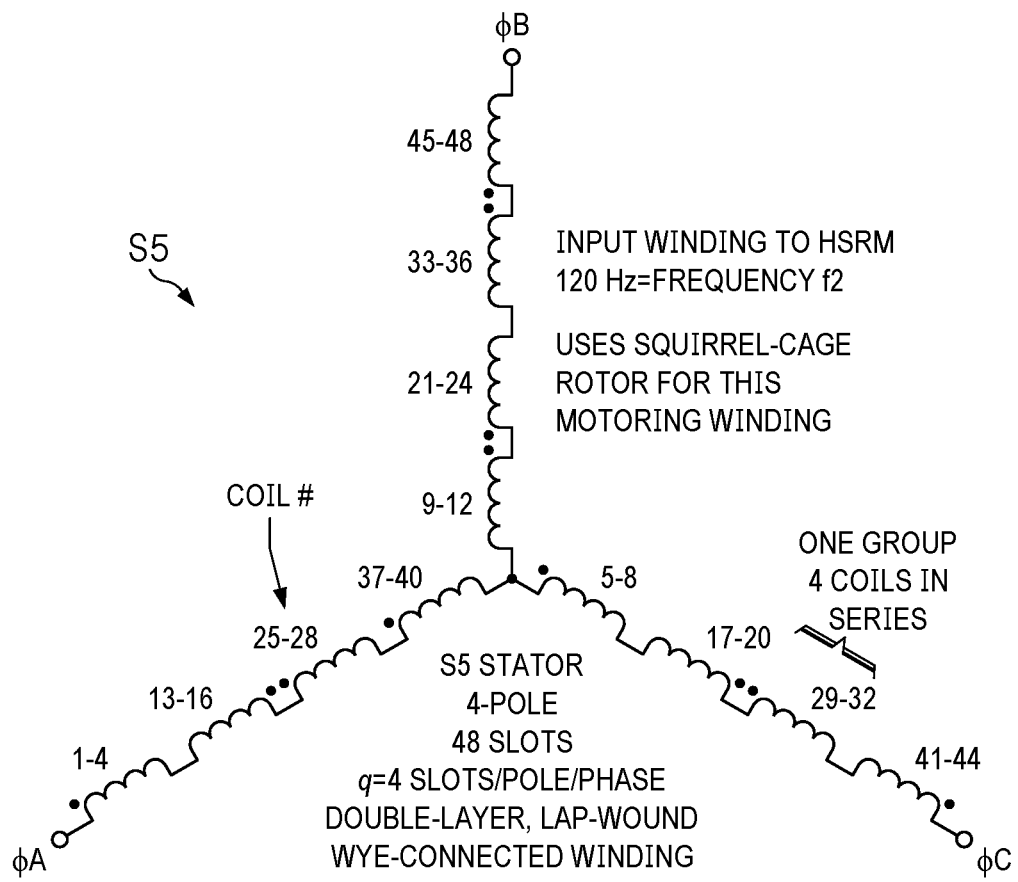
FIGS. 6A through 6D illustrate example winding diagrams for various stator and rotor ports according to this disclosure.
Figure 6B:
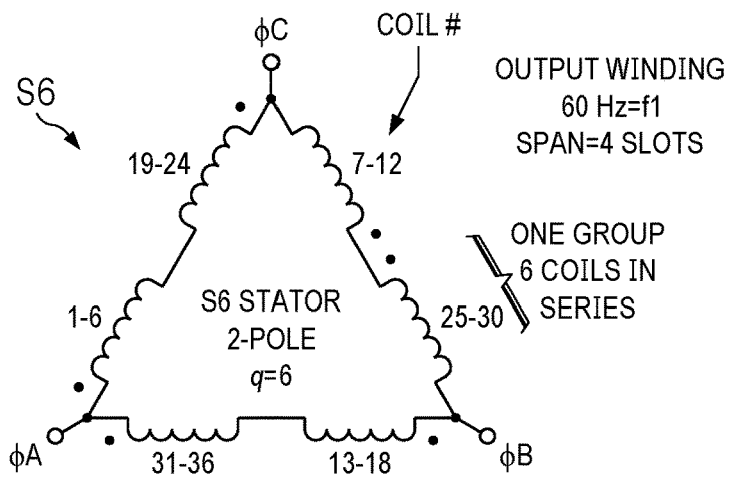
Figure 6C:
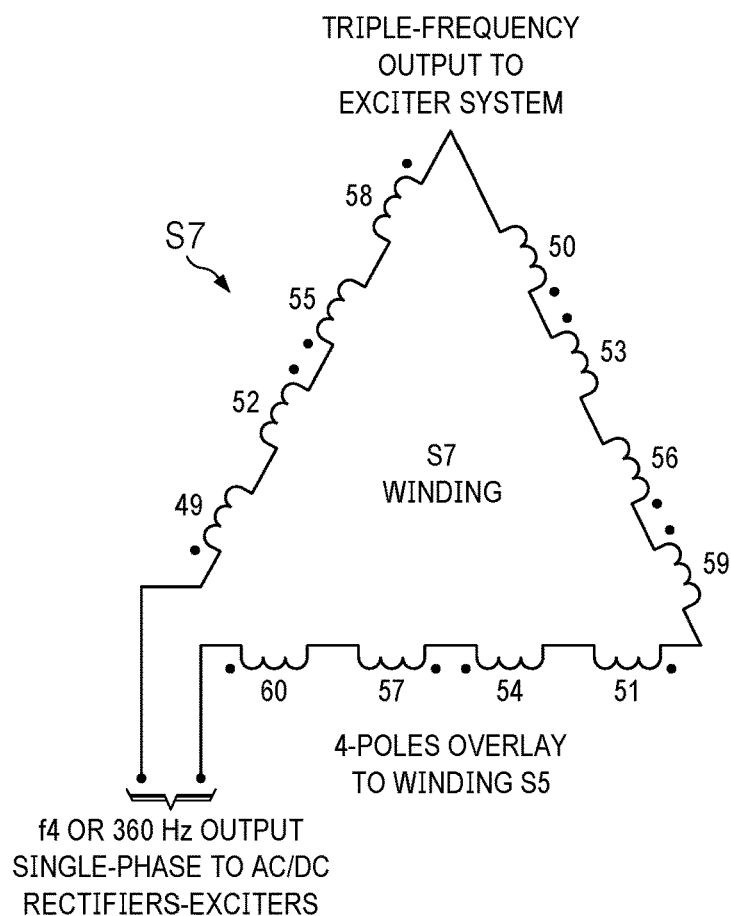
Figure 6D:
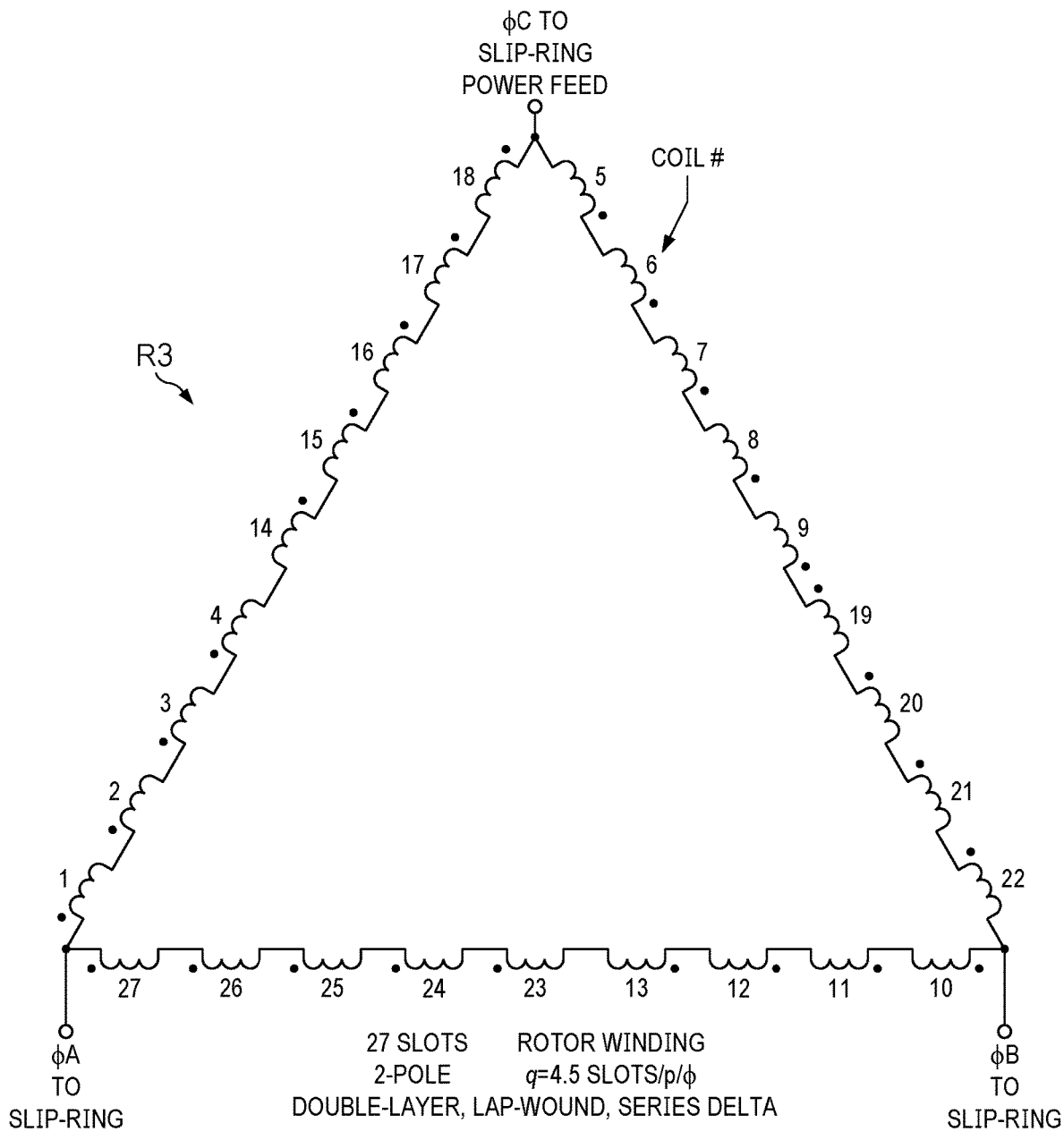

FIG. 5 illustrates still another active harmonic filter and reactive power control system 500 according to this disclosure. In some embodiments, the system 500 can include or be part of a naval ship power system. However, the system 500 can include or be a part of any other suitable system(s). The system 500 includes multiple components that may be the same as or similar to corresponding components in the system 400 of FIG. 4. However, in the system 500, a common exciter AC bus 502 feeds all rotating machine sets from the HSRM 420 via a secondary output winding/port S7.

As shown in FIGURE S, the exciters 422 and 426, which feed the rotor ports R1, R2, and R3 for the HESMs 410 and the HSRM 420, are fed from the output winding/port S7 at the HSRM 420. The output winding/port S7 may be a low-voltage low-power winding, whereas the main output port S6 may be a high-voltage high-power winding. This arrangement is advantageous or necessary since the power supplies for the exciters 422 and 426 should not have electrical perturbations from the main electrical bus 404 or from the combat system bus 406. The output frequency f2 from the AC-to-AC frequency converter 418 may be higher than the main frequency (such as about 120 Hz) and powers the winding S5 of the HSRM 420, which is a four-pole winding allowing a shaft speed (such as about 3550 RPM). The generating winding S6 can be a two-pole stator winding, which may have an output frequency of about 60 Hz, to allow injection of Q1 reactive power at the main line frequency f1.

The exciter frequency f4 of the output winding/port S7 can be about 360 Hz. This can be a single-phase output using a magnetic frequency tripler arrangement derived from a 120 Hz input frequency. Any suitable frequency tripler circuit can be used. The output winding/port S7 can be an open-delta winding, and the primary winding may be a wye-connected stator as is shown for the winding S5. The power generated by the output winding/port S7 is distributed to multiple excitation power supply loads and rectified and inverted for machine rotor excitation power. Thus, the HSRM 420 has three operating electrical frequencies on the stator windings of a combined motor-generator set.

In some embodiment, the stators S5 and S7 interact with a cage type or solid induction rotor. In other embodiments, the main or reactive output winding S6 interacts strictly with a polyphase wound rotor yet is mounted on the same shaft as the cage rotor. FIGS. 6A through 6D illustrate example winding layouts for the S5, S6, S7 and R3 ports, respectively, according to this disclosure.

Figure 7:
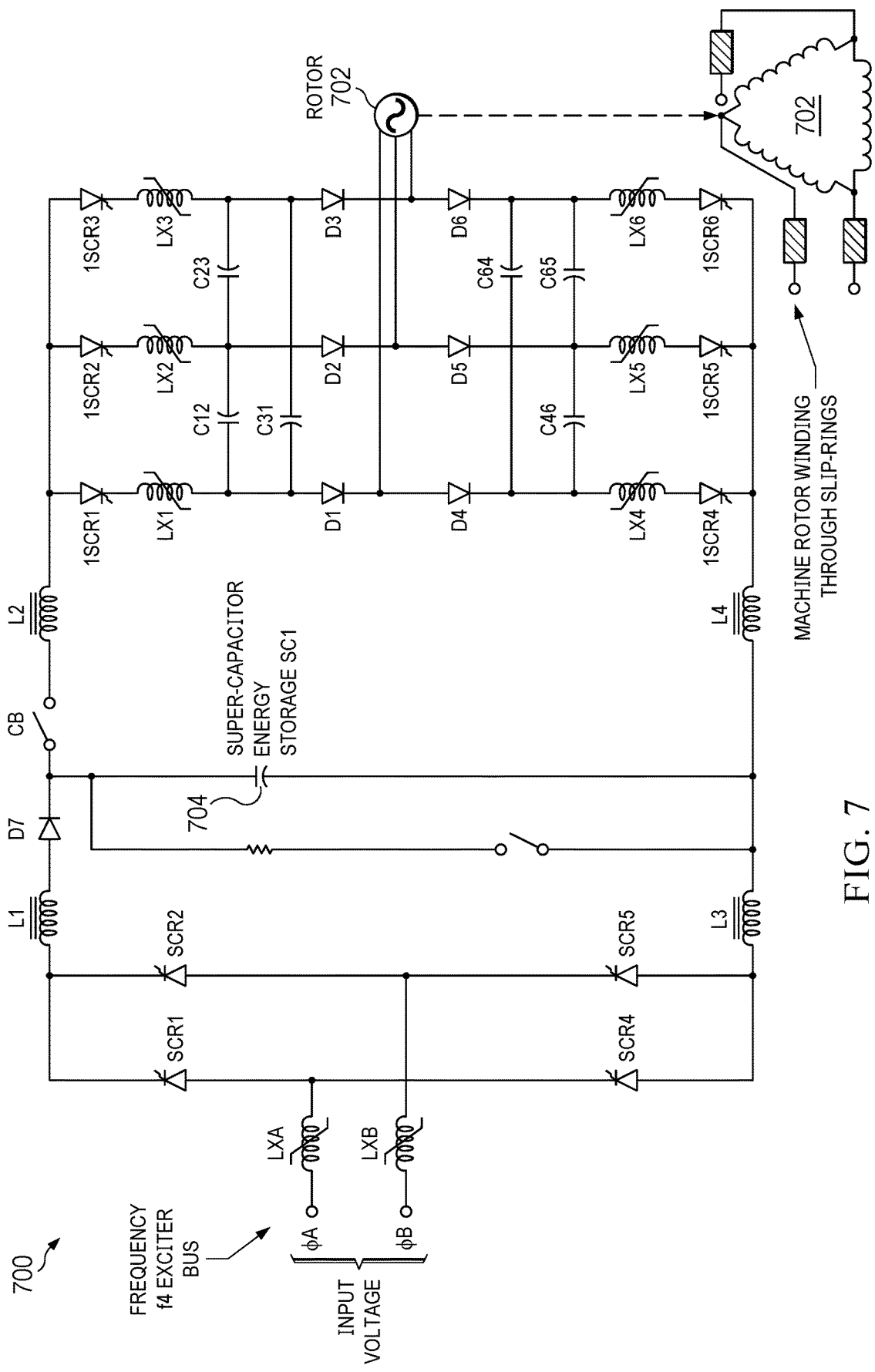
FIG. 7 illustrates an example exciter sub-system that can be used with an active harmonic filter and reactive power control system according to this disclosure.

FIG. 7 illustrates an example exciter sub-system 700 that can be used with an active harmonic filter and reactive power control system according to this disclosure. In some embodiments, the exciter sub-system 700 can be part of the power control system 400 of FIG. 4 or the power control system 500 of FIG. 5. In particular, the exciter sub-system 700 can be used for all electrical machines rotor supply circuits in the power control systems 400 and 500. However, the exciter sub-system 700 can be a part of any other suitable system(s).

As shown in FIG. 7, the exciter sub-system 700 operates as an exciter power supply to produce variable-frequency variable-voltage AC power into ports R1, R2, and R3 of a rotor winding 702. An intermediate super-capacitor energy storage bank 704 located on the DC link provides filtering and stabilization of the DC power prior to final frequency inversion by devices ISCR1 through ISCR6. The input frequency to the exciter sub-system 700 may be a moderate frequency (such as about 180 Hz or 360 Hz), and the output "slip" frequency to the machine rotor is a variable low-frequency (such as about 5-30 Hz).

Although FIGS. 1 through 7 illustrate examples of active harmonic filter and reactive power control systems and related details, various changes may be made to FIGS. 1 through 7. For example, various components in the systems 100, 200, 400, and 500 may be combined, further subdivided, replicated, rearranged, or omitted and additional components may be added according to particular needs. Also, while FIGS. 1 through 7 illustrate example operational environments in which active harmonic filtering and reactive power control can be performed, this functionality may be used in any other suitable systems.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with." as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A. B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device." "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
a main power source configured to provide power to at least one pulsed load;
a propulsion converter configured to drive a propulsion motor; and
a controllable-field induction electrical machine coupled to the at least one pulsed load, the controllable-field induction electrical machine configured to suppress one or more propulsion current harmonics generated by the propulsion converter that affect the at least one pulsed load.

2. The system of claim 1, further comprising:
a filter reactor coupled to the propulsion converter and configured to (i) generate a feed-forward signal in response to the one or more propulsion current harmonics and (ii) output the feed-forward signal for use by the controllable-field induction electrical machine.

3. The system of claim 2, wherein the feed-forward signal comprises multiple signals corresponding to different harmonic frequencies of the one or more propulsion current harmonics.

4. The system of claim 2, further comprising:
one or more power amplifiers configured to amplify the feed-forward signal before the feed-forward signal is input to an excitation system for the controllable-field induction electrical machine.

5. The system of claim 2, wherein the controllable-field induction electrical machine comprises a polyphase rotor circuit configured to receive an excitation signal in response to the feed-forward signal generated by the filter reactor.

6. The system of claim 5, further comprising:
an alternating current (AC)-to-alternating current (AC) converter and multiple injection transformers configured to generate the excitation signal provided to the polyphase rotor circuit.

7. The system of claim 5, further comprising:
an inertial energy storage flywheel coupled to the polyphase rotor circuit and configured to store and deliver energy for use by the at least one pulsed load.

8. The system of claim 7, further comprising:
a speed and torque controller (STC) configured to control a frequency and a magnetic flux level provided to the controllable-field induction electrical machine in order to maintain the inertial energy storage flywheel at a specified speed and kinetic energy level after one or more load discharge events related to the at least one pulsed load.

9. The system of claim 1, wherein the controllable-field induction electrical machine further comprises a stator input winding and multiple stator output windings.

10. A system comprising:
an alternating current (AC) generator configured to provide real and reactive power for at least one pulsed load over a main bus;
at least one hybrid energy storage module (HESM) configured to store at least some of the real and reactive power as energy for later use by the at least one pulsed load; and
a high-speed asynchronous rotating machine (HSRM) configured to (i) supply the reactive power to the at least one HESM via a stator port and (ii) suppress one or more harmonics generated by a first AC-to-AC frequency converter that affect the at least one pulsed load.

11. The system of claim 10, wherein the HSRM is configured to operate as an asynchronous condenser (ASC)

that provides adjustable reactive power at one or more output ports to provide reactive power to the at least one pulsed load.

12. The system of claim 10, further comprising:
a second AC-to-AC frequency converter configured to regulate a frequency of the real and reactive power before the real and reactive power is input to the at least one HESM.

13. The system of claim 10, wherein:
the at least one pulsed load comprises multiple pulsed loads; and
the at least one HESM comprises multiple HESMs, each HESM coupled to and configured to store and deliver energy for one of the multiple pulsed loads.

14. The system of claim 10, wherein the HSRM and the at least one HESM are each coupled to a corresponding exciter configured to feed an excitation current to a rotor winding of the HSRM or HESM.

15. The system of claim 14, wherein the exciters are coupled to a common exciter bus.

16. The system of claim 14, wherein each exciter is configured to produce variable-frequency variable-voltage AC power that is input into multiple ports of the corresponding rotor winding to control a magnetic flux level of the HSRM or HESM.

17. A filter device comprising:
an inertial energy storage flywheel; and
a controllable-field induction electrical machine coupled to the inertial energy storage flywheel, the controllable-field induction electrical machine comprising:
a stator input winding;
multiple stator output windings configured to connect to at least one pulsed load; and
a polyphase rotor circuit configured to receive a feed-forward signal that is generated in response to one or more propulsion current harmonics that affect the at least one pulsed load;
wherein the feed-forward signal is configured to control the controllable-field induction electrical machine and the inertial energy storage flywheel to suppress the one or more propulsion current harmonics.

18. The filter device of claim 17, wherein the inertial energy storage flywheel is coupled to the polyphase rotor circuit and is configured to store and deliver energy for use by the at least one pulsed load.

19. The filter device of claim 17, wherein the feed-forward signal comprises multiple signals corresponding to different harmonic frequencies of the one or more propulsion current harmonics.

20. The filter device of claim 17, further comprising:
a speed and torque controller (STC) configured to control a frequency and a magnetic flux level provided to the controllable-field induction electrical machine in order to maintain the inertial energy storage flywheel at a specified speed and kinetic energy level after one or more load discharge events related to the at least one pulsed load.

* * * * *